United States Patent
Ghazal et al.

(10) Patent No.: US 6,990,484 B1
(45) Date of Patent: Jan. 24, 2006

(54) DETERMINING THE SATISFIABILITY AND TRANSITIVE CLOSURE OF CONDITIONS IN A QUERY

(75) Inventors: Ahmad Ghazal, Redondo Beach, CA (US); Curtis Ellmann, Madison, WI (US)

(73) Assignee: NCR Corporation, Dayton, OH (US)

( * ) Notice: Subject to any disclaimer, the term of this patent is extended or adjusted under 35 U.S.C. 154(b) by 242 days.

(21) Appl. No.: 10/215,828

(22) Filed: Aug. 9, 2002

(51) Int. Cl.
*G06F 17/30* (2006.01)
(52) U.S. Cl. ............................................. 707/3; 707/4
(58) Field of Classification Search ............... 707/2, 707/3, 4, 5, 6, 10, 9, 104.1; 345/744, 866; 706/11
See application file for complete search history.

(56) References Cited

U.S. PATENT DOCUMENTS 5,727,196 A * 3/1998 Strauss et al. ................. 707/2
5,899,993 A * 5/1999 Jenkins, Jr. ..................... 707/9

OTHER PUBLICATIONS

UVA ODS Specialist, Applying Conditions and Parameters, Jun. 17, 2002, University of Virginia, pp. 1-18.*

* cited by examiner

*Primary Examiner*—Apu M. Mofiz
(74) *Attorney, Agent, or Firm*—Baker Botts LLP

(57) ABSTRACT

A method and computer system for improving the efficiency of execution of a database query that includes conditions is disclosed. Satisfiability of the conditions is analyzed before executing the query. If the conditions are satisfiable, the transitive closure of the conditions is analyzed and the conditions are modified to meet transitive closure, if necessary, before executing the query.

17 Claims, 18 Drawing Sheets

| 0 | infinity | infinity |
| 5 | 0 | -1 |
| 4 | infinity | 0 |

G1

| 0 | infinity | infinity |
| 3 | 0 | -1 |
| 4 | infinity | 0 |

G2

DETERMINING THE SATISFIABILITY AND TRANSITIVE CLOSURE OF CONDITIONS IN A QUERY

BACKGROUND

SQL queries frequently include one or more conditions, or constraints. The constraints are typically found in query WHERE clauses. Constraints can be contradictory (the opposite is called "satisfiable"). For example, a query like "Select * from Table1 where Table1.C1=1 and Table1.C1>5" will always return no rows regardless of the data in T1. This is true since C1=1 and C1>5 is always false for all values of C1. Checking if a set of constraints are satisfiable could be very useful in database management system. If the query optimizer of the database has the ability to check if a set of conditions is satisfiable, or "SAT," then such queries could be answered immediately without accessing the data.

Transitive closure, or TC, of a set of constraints S1, denoted by TC(S1), is the set of all possible derivable constraints from S1. For example if S1 is (a=b and a=1) then TC(S1) will be (b=1). As illustrated in this simple example, a query can be executed more efficiently if its TC can be determined before execution.

SUMMARY

In general, in one aspect, the invention features a method for improving the efficiency of a database query that includes conditions. The method includes analyzing the satisfiability of the conditions before executing the query. If the conditions are satisfiable, the method includes analyzing the transitive closure of the conditions and modifying the conditions to meet transitive closure, if necessary, before executing the query.

Implementations of the invention may include one or more of the following. Analyzing satisfiability may include converting the conditions to less-than-or-equal-to conditions, creating a map M of the less-than-or-equal-to conditions, finding the shortest path between all nodes in M, and determining if M has a negative cycle and, if it does, returning that the conditions are not satisfiable. The conditions may include integer variables X and Y and constants, C, and converting the conditions may include:

converting conditions of the form (X<Y+C) to conditions of the form (X<=Y+(C−1));
converting conditions of the form (X>Y+C) to conditions of the form (Y<=X+(−C−1));
converting conditions of the form (X=Y+C) to conditions of the form (X<=Y+C) and (Y<=X+(−C));
performing no conversion for (X<=Y+C);
converting conditions of the form (X<=C) to conditions of the form (X<=0+C);
converting conditions of the form (X<C) to conditions of the form (X<=0+(C−1));
convert conditions of the form (X>=C) to conditions of the form (0<=X+(−C));
convert conditions of the form (X>C) to conditions of the form (0<=X+(−C−1)); and
convert conditions of the form (X=C) to conditions of the form (X<=0+C) and (0<=X+(−C)).

The conditions may include real variables U and V and constants, C, and converting the conditions may include:

converting conditions of the form U<C to conditions of the form U<=C1, where C1 is the largest real number less than C;
converting conditions of the form U>C to conditions of the form C1<=U, where C1 is the smallest real number greater than C;
converting conditions of the form U<V+C to conditions of the form U<=V+C and U<>V+C;
converting conditions of the form U+C<V to conditions of the form U<=V−C and U<>V−C;
converting conditions of the form U>V+C to conditions of the form U>=V+C and U<>V+C; and
converting conditions of the form U+C>V+C to conditions of the form U>=V−C and U<>V−C.

Creating a map M of the less-than-or-equal-to conditions may include creating a node for each of the variables in the conditions and creating a node for 0. Creating the map may further include:

creating a directed edge from a node representing a first variable, S, to a node representing a second variable, T, with a cost, C, for conditions of the form (S<=T+C);
creating a directed edge from a node representing a first variable, S, to the 0 node, with cost C, for conditions of the form (S<=0+C); and
creating a directed edge from the 0 node to a node representing a first variable, S, with cost C, for conditions of the form (0<=X+C).

Finding the shortest path between all nodes in M may include running the Floyd-Warshall Shortest Path Algorithm against M. Determining if M has a negative cycle may include finding if M includes a negative cost edge from a node to itself. Analyzing the transitive closure of the conditions and modifying the conditions to achieve transitive closure may include:

saving the map M as G1, where G1 maps the cost of edges between a plurality of variables in M, before finding the shortest path between all nodes in M;
saving the map M as G2, where G2 maps the shortest path between each of the plurality of variables in M, after finding the shortest path between all nodes in M;
for each pair of variables X and Y in G2 for which there is a path from X to Y with cost C1,
  if C1 is less than the shortest path from X to Y in G1, C2,
    removing the condition from the query that created the path from X to Y in G1;
    adding a condition X<=Y+C1 to the query; and
  if G1 does not have a link from X to Y
    adding a condition X<=Y+C1 to the query.

The conditions may include one or more variables, one or more SQL IN (inlist) conditions, and one or more SQL NOT IN (not in list) conditions. Analyzing the satisfiability of the conditions may include:

for each variable in the query, defining an in list from a SQL IN statement associated with the variable, a <>list from the SQL NOT IN statement's not in list and any other query statements that relate the variable to a constant with a <>operator, and an interval for the range of values associated with the variable;
finding all components, where each component includes variables related in the query by an equals relation;
for each component:
  computing an INLIST for the component which contains the intersection of the in lists for the variables in the component;
  computing an NELIST for the component which contains the union of the <>lists for the variables in the component;

computing an INTERVAL for the component which contains the intersection of the intervals for the variables in the component;

determining that the conditions are not satisfiable if any of the following conditions are met:

two variables X and Y are in one component and one of the conditions is of the form X<>Y;

at least one component has an empty INTERVAL;

at least one component has an empty INLIST; or the combination of any pair of INLIST, NELIST and INTERVAL of a component is contradictory, where:

an INLIST and an NELIST are contradictory if the INLIST is a subset of the NELIST;

an INLIST and an INTERVAL are contradictory if all the INLIST values are outside the values of the INTERVAL;

an NELIST and an INTERVAL are contradictory if the INTERVAL is a single point.

Modifying the conditions to meet transitive closure may include applying the INLIST, NELIST, and INTERVAL for a component to each variable in the component.

In general, in another aspect, the invention features a method for determining the satisfiability of and creating transitive closure in conditions in a database query. The conditions include a plurality of variables and constants. The method includes converting the conditions to less-than-or-equal-to conditions between variables and constants. The method further includes creating a map M of the costs of the less-than-or-equal-to conditions between the plurality of variables and constants in the conditions. The method further includes saving the map M as G1. The method further includes finding the shortest path between all nodes in M, and referring to the map with the shortest paths as G2, where G2 maps the shortest path between each of the plurality of variables in M. The method further includes determining if M has a negative cycle and, if it does, returning that the conditions are not satisfiable. The method further includes for each pair of variables X and Y in G2 for which there is a path from X to Y with cost C1:

if C1 is less than the shortest path from X to Y in G1, C2:

removing the condition from the query that created the path from X to Y in G1;

adding a condition X<=Y+C1 to the query; and if G1 does not have a link from X to Y:

adding a condition X<=Y+C1 to the query.

In general, in another aspect, the invention features a method for determining the satisfiability of and creating transitive closure in conditions in a database query. The conditions include one or more variables, zero or more SQL IN (inlist) conditions, and zero or more SQL NOT IN (not in list) conditions. The method includes for each variable in the query, defining an in list from a SQL IN statement associated with the variable, a <>list from the SQL NOT IN statements not in list and any other query statements that relate the variable to a constant with a <>operator, and an interval for the range of values associated with the variable. The method further includes finding all components, where each component includes variables related in the query by an equals relation. For each component, the method includes;

computing an INLIST for the component which contains the intersection of the in lists for the variables in the component;

computing an NELIST for the component which contains the union of the <>lists for the variables in the component;

computing an INTERVAL for the component which contains the intersection of the intervals for the variables in the component;

determining that the conditions are not satisfiable if any of the following conditions are met:

two variables X and Y are in one component and one of the conditions is of the form X<>Y;

at least one component has an empty INTERVAL;

at least one component has an empty INLIST; or the combination of any pair of INLIST, NELIST and INTERVAL of a component is contradictory, where:

an INLIST and an NELIST are contradictory if the INLIST is a subset of the NELIST;

an INLIST and an INTERVAL are contradictory if all the INLIST values are outside the values of the INTERVAL;

an NELIST and an INTERVAL are contradictory if the INTERVAL is a single point; and if the conditions are satisfiable, applying the INLIST, NELIST, and INTERVAL for a component to each variable in the component.

In general, in another aspect, the invention features a computer program, stored on a tangible storage medium, for use in improving the efficiency of a database query including conditions. The program includes executable instructions that cause a computer to analyze the satisfiability of the conditions before executing the query and if the conditions are satisfiable, analyze the transitive closure of the conditions and modify the conditions to meet transitive closure, if necessary, before executing the query.

DETAILED DESCRIPTION

A query optimizer determines the satisfiability and transitive closure of constraints in a query before the query is executed.

Figure 1:
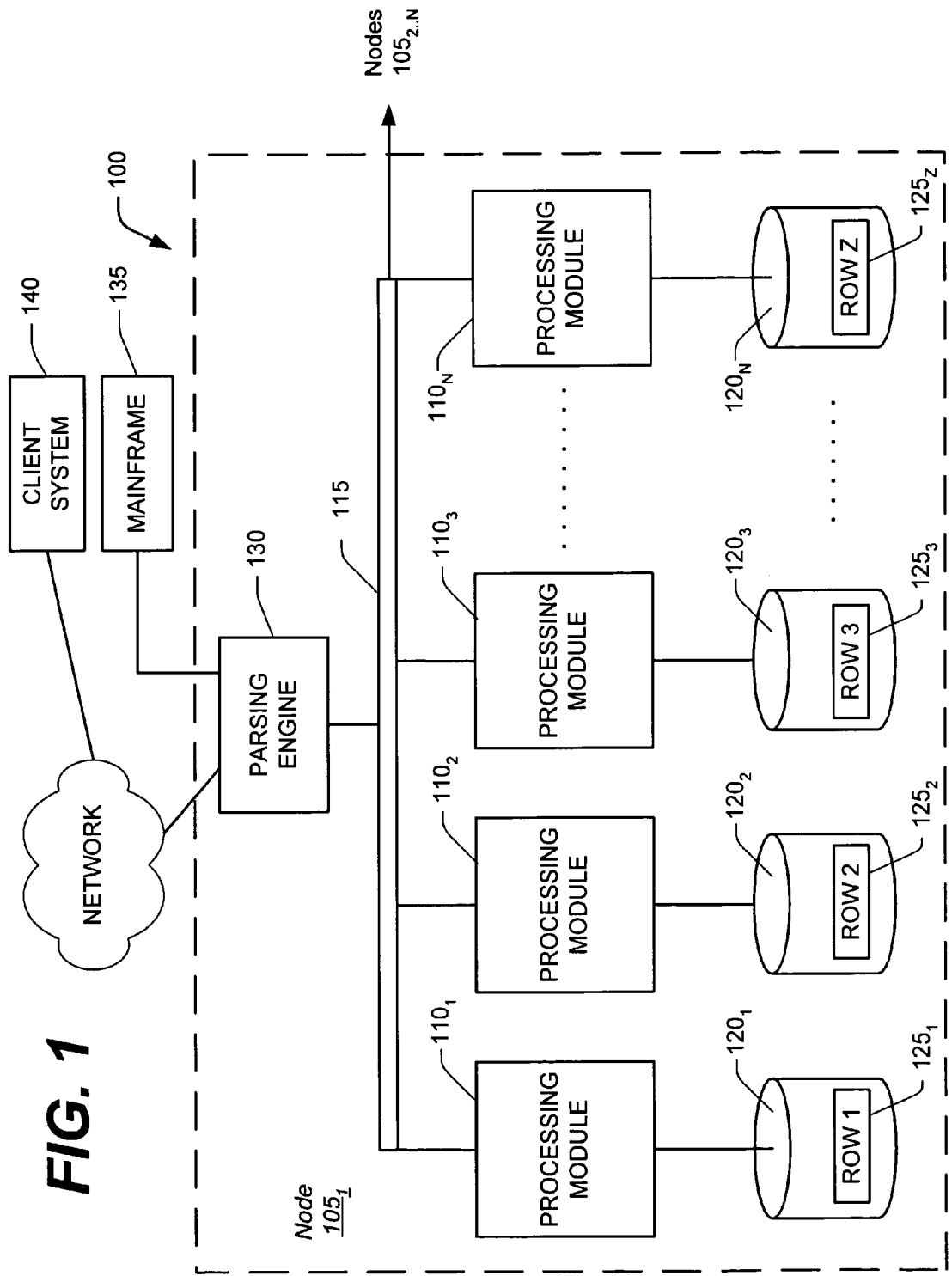
FIG. 1 is a block diagram of a node of a database system.

The techniques for determining the satisfiability and transitive closure of conditions in a query as disclosed herein may be used with large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots N}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

Figure 2:
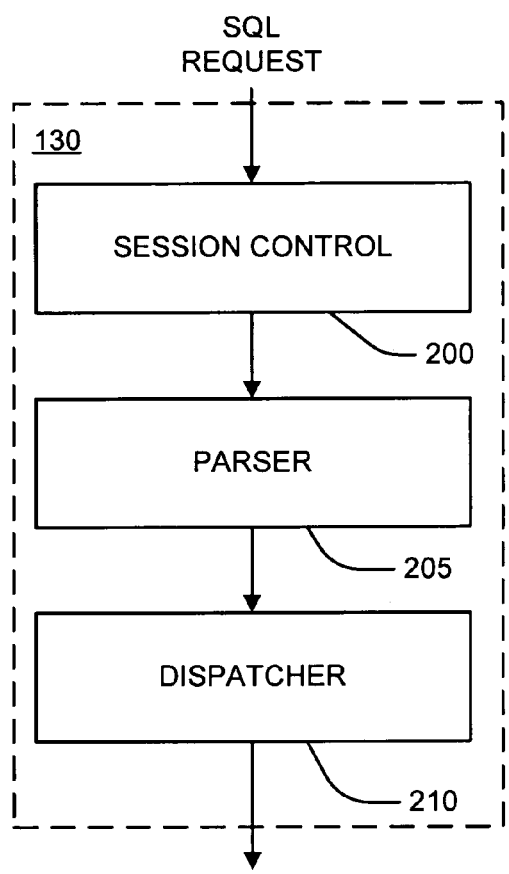
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
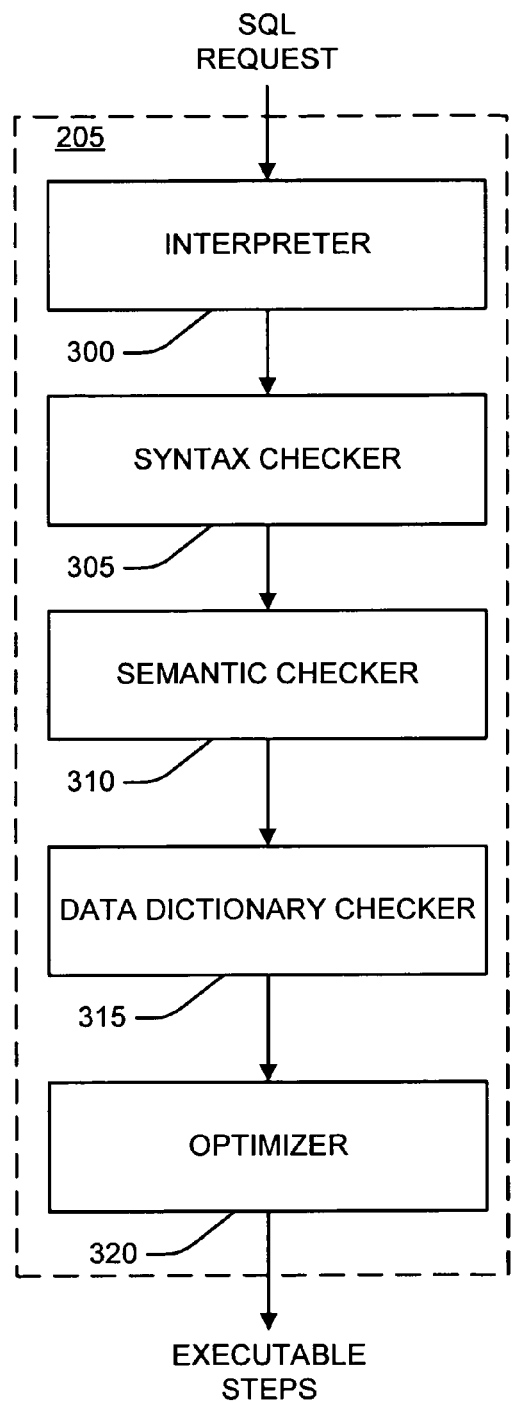
FIG. 3 is a flow chart of a parser.

Once the session control 200 allows a session to begin, a user may submit a SQL request, which is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which develops the least expensive plan to perform the request.

To illustrate the technique for determining the satisfiability and transitive closure of conditions in a query, consider a company that maintains its customer's orders separately for each quarter. Therefore, the orders are stored in four tables, FirstQOrders, SecondQOrders, ThirdQOrders and FourthQOrders. The union of the four tables is all the orders. Each of the four tables is defined with a check constraint to enforce the date range and a view is defined as a union of the four tables. The following is the DDL for the tables and the view:

CREATE TABLE FirstQOrders (
  O_ORDERKEY INTEGER, O_CUSTKEY INTEGER,
  O_ORDERSTATUS CHAR(1), O_TOTALPRICE DECIMAL(15,2),
  O_ORDERDATE DATE,O_COMMENT VARCHAR (79),
CHECK (EXTRACT(MONTH FROM O_ORDERDATE)
  >=1 and EXTRACT(MONTH FROM O_ORDERDATE)<=3));
CREATE TABLE SecondQOrders (
  O_ORDERKEY INTEGER, O_CUSTKEY INTEGER,
  O_ORDERSTATUS CHAR(1), O_TOTALPRICE DECIMAL(15,2),
  O_ORDERDATE DATE,O_COMMENT VARCHAR (79),
CHECK (EXTRACT(MONTH FROM O_ORDERDATE)
  >=4 and EXTRACT(MONTH FROM O_ORDERDATE)<=6));
CREATE TABLE ThirdQOrders (
  O_ORDERKEY INTEGER, O_CUSTKEY INTEGER,
  O_ORDERSTATUS CHAR(1), O_TOTALPRICE DECIMAL(15,2),
  O_ORDERDATE DATE,O_COMMENT VARCHAR (79),
CHECK (EXTRACT(MONTH FROM O_ORDERDATE)
  >=7 and EXTRACT(MONTH FROM O_ORDERDATE)<=9));
CREATE TABLE FourthQOrders (
  O_ORDERKEY INTEGER, O_CUSTKEY INTEGER,
  O_ORDERSTATUS CHAR(1), O_TOTALPRICE DECIMAL(15,2),
  O_ORDERDATE DATE,O_COMMENT VARCHAR (79),
CHECK (EXTRACT(MONTH FROM O_ORDERDATE)
  >=10 and EXTRACT(MONTH FROM O_ORDERDATE)<=12));
CREATE VIEW ORDERTBL AS
SELECT * FROM FirstQOrders UNION SELECT * FROM SecondQOrders UNION
SELECT * FROM ThirdQOrders UNION SELECT * FROM FourthQOrders;

Typically, users will query ORDERTBL because it is a whole view of all the orders. Further, users may not have permission on the individual four tables and can only access the data through ORDERTBL.

In many cases, users would like to query orders for a specific month or months. For example, "SELECT * FROM ORDERTBL where EXTRACT(MONTH FROM O_ORDERDATE)=9" retrieves all orders for the month of September. In many existing systems, the optimizer will expand the view by computing the union of the four tables and then apply the date restriction. This is not efficient because only ThirdQOrders need to be accessed for this query. The optimizer could avoid this step if it determined that the query condition and the check constraint for FirstQOrders are not satisfiable. More specifically, EXTRACT(MONTH FROM O_ORDERDATE)=9 and EXTRACT(MONTH FROM O_ORDERDATE)>=1 and EXTRACT(MONTH FROM O_ORDERDATE)<=3 is mathematically false. The same test can be applied with the same result to SecondQOrders and FourthQOrders. Were these tests executed and interpreted as described above, the optimizer could drop three fragments of the union and the database management system (DBS) would only access ThirdQOrders, resulting in an increase in the efficiency of the execution of the query.

One well known algorithm for determining SAT, investigated by Rosenkrantz and Hunt, fits well in the pertinent scope of conditions. This algorithm considers only conjunctive conditions, where each condition is of the form (X op Y+C) or (X op C). Both X and Y are integer variables and C is an integer constant and op $\epsilon\{<,=,>,>=,<=\}$.

Figure 4:
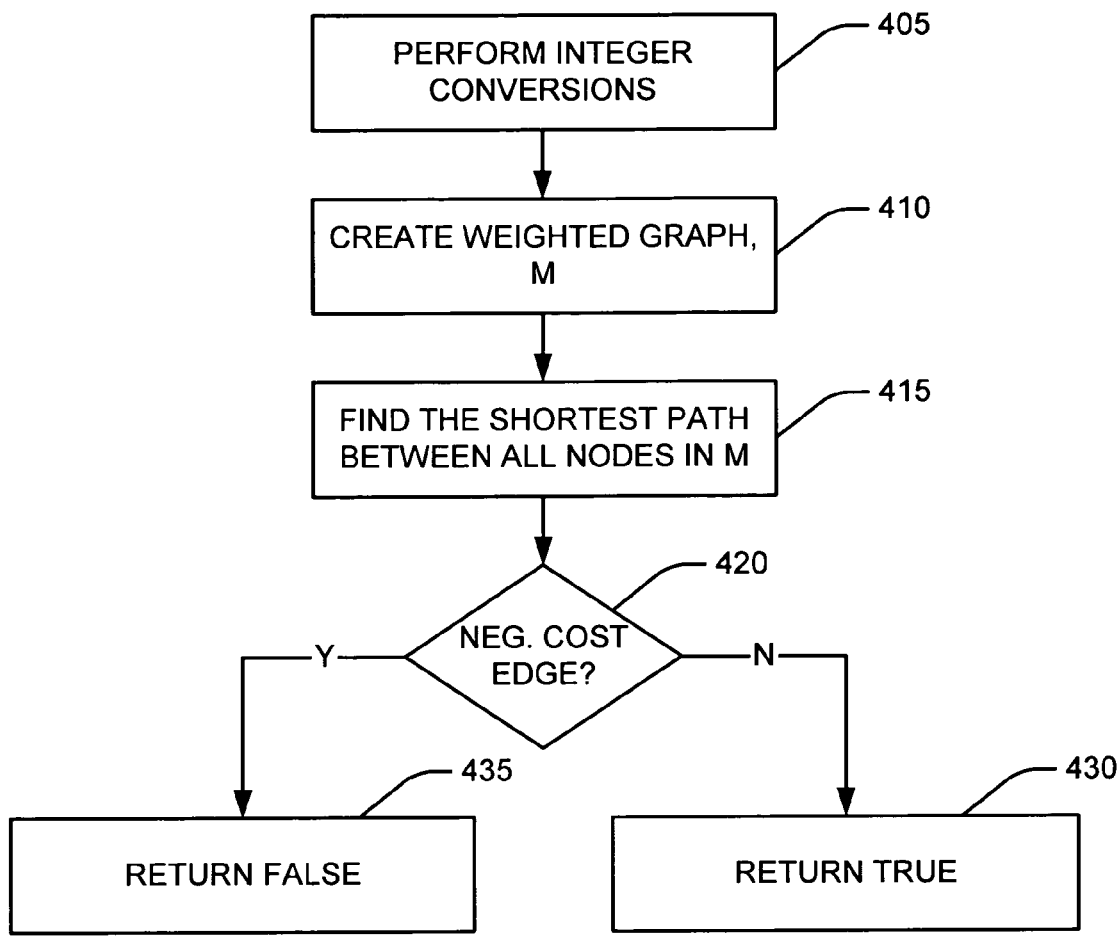
FIGS. 4–6, 9–17 and 19–20 are flow charts of processes for determining the satisfiability and transitive closure of conditions in a query.
Figure 5:
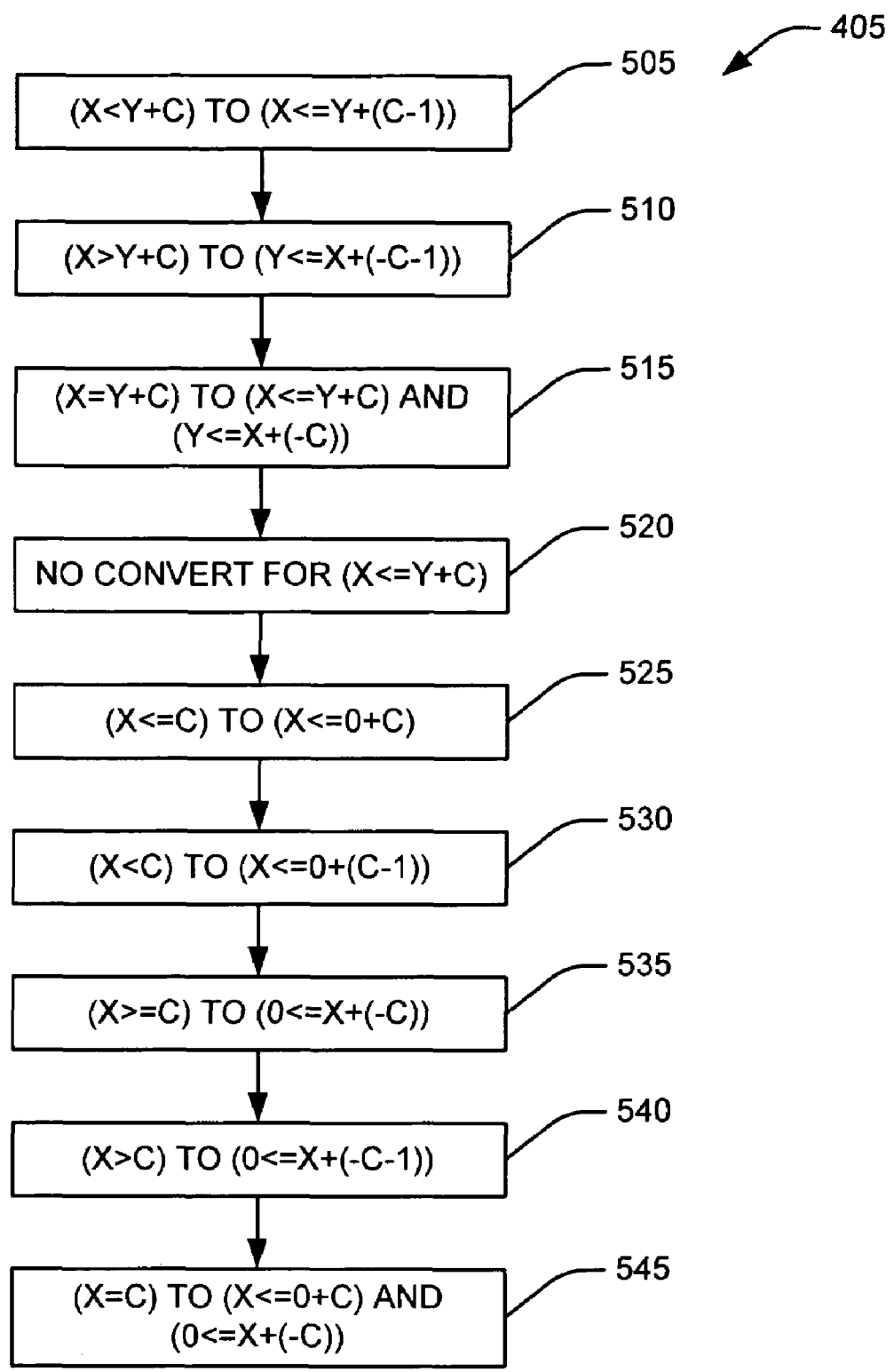

The function SPA-SAT, outlined below and illustrated in FIG. 4, returns false if the set of conditions is not satisfiable, otherwise it returns true:

Function SPA-SAT
begin
1. Convert all conditions to <= comparisons only using the following transformation (block 405, expanded in FIG. 5):
2. Convert (X<Y+C) to (X<=Y+(C−1)) (block 505)
3. Convert (X>Y+C) to (Y<=X+(−C−1)) (block 510)
4. Convert (X=Y+C) to (X<=Y+C) and (Y<=X+(−C)) (block 515)
5. No conversion needed for (X<=Y+C) (block 520)
6. Convert (X<=C) to (X<=0+C) (block 525)
7. Convert (X<C) to (X<=0+(C−1)) (block 530)
8. Convert (X>=C) to (0<=X+(−C)) (block 535)
9. Convert (X>C) to (0<=X+(−C−1)) (block 540)
10. Convert (X=C) to (X<=0+C) and (0<=X+(−C)) (block 545)

Figure 6:
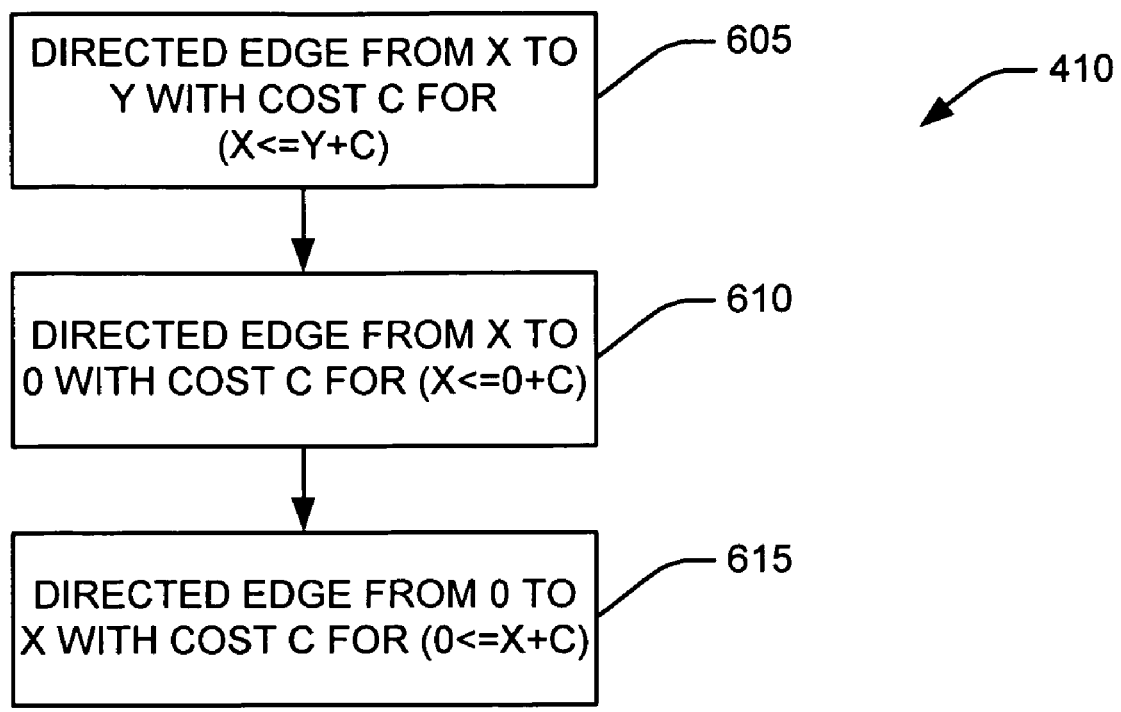

The above conversions will cover (X<Y) (same as Y>X), X=Y if C=0
11. Create a weighted directed graph M={V,E} (block 410). V is the graph's nodes composed of the variables in the constraints plus a special node for 0. E is the set of edges and it reflects the constraints in the following way (FIG. 6):
A directed edge from X to Y with cost C for (X<=Y+C) (block 605);
A directed edge from X to 0 with cost C for (X<=0+C) (block 610);
A directed edge from 0 to X with cost C for (0<=X+C) (block 615);
12. Find the shortest path between all nodes in M using "Floyd-Warshall Shortest Path Algorithm" (block 415). The resulting updated M also will have the shortest paths between the nodes.
13. The set of constraints is "contradictory" if and only if (block 420) M has a negative cost edge from a node to itself. If so, return FALSE (block 425).
14. Return TRUE (block 430).
end An example of the application of SPA-SAT uses as the constraints:
V1=9 V1>=4 V1<=6

The algorithm converts these constraints to:
V1<=0+9 0<=V1+(−4) V1<=0+6
0<=V1+(−9)

Figure 7:
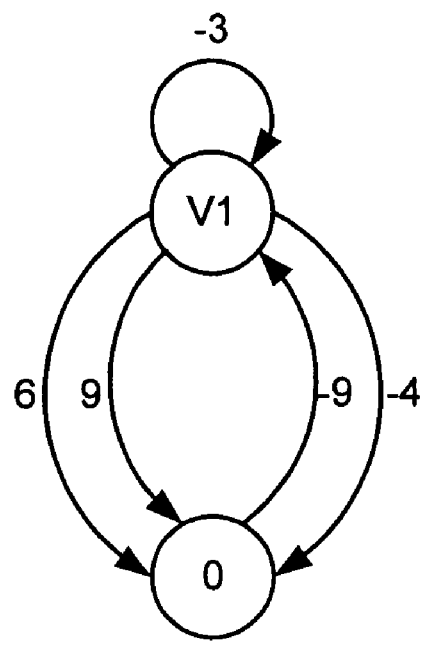
FIGS. 7 and 8 illustrate weighted maps.

A graph, illustrated in FIG. 7, is then constructed. The graph has two nodes, one for V1 and the other for "0." Edges are created in the graph according to the rules in the algorithm. It can then be readily determined that the shortest path from V1 to itself (represented by the self edge with value −3) is negative (6+(−9)), which means that the conditions are not satisfiable. This is not surprising because V1 cannot equal 9 and be between 4 and 6.

Another example of the application of SPA-SAT uses as the constraints:
V1=5 V1>=4 V1<=6

The algorithm converts these constraints to:
V1<=0+5 0<=V1+(−4) V1<=0+6
0<=V1+(−5)

Figure 8:
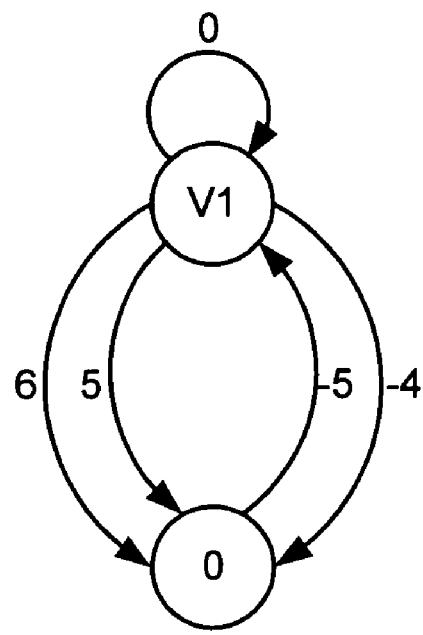

A graph, illustrated in FIG. 8, is then constructed. The graph has two nodes, one for V1 and the other for "0." Edges are created in the graph according to the rules in the algorithm. It can then be readily determined that the shortest path from V1 to itself (represented by the self edge with value 0) is not negative (5+(−5)), which means that the conditions are satisfiable. Again, this is not surprising because V1 can equal 5 and still be between 4 and 6.

Determination of the shortest path in the two examples in FIGS. 7 and 8 was possible by examining the weighted graphs because of the simplicity of the graphs. For more complicated graphs, the shortest path can be determined using the Floyd-Warshall algorithm. The Floyd-Warshall algorithm takes as an input a weighted directed graph between n variables. Assume that the variables are denoted by $\{1,2,\ldots n\}$. A two-dimensional n-by-n distance matrix M, such as the weighted directed graph M created in SPA-SAT, is created to represent the distance (or cost) between each pair from the n variables. $M_{I,J}$ represents the distance from I to J and it is set to ∞ if there is no edge from I to J. $D^k_{I,J}$ is the shortest path from I to J through at most k edges. M will also be the output with the updated paths between the nodes.

Begin $D^0 = M$ for $K = 1$ to $n$ do for $I = 1$ to $n$ do for $J = 1$ to $n$ do $$D^k_{I,J} = \min(D^{k-1}_{IJ}, D^{k-1}_{IK} + D^{k-1}_{KJ})$$

$M = D^n$

End $D^k_{I,J}$ denotes the length of the shortest path from I to J that goes through at most K intermediate vertices. Note that space $O(n^2)$ suffices, because only $D^{k-1}_{I,J}$ and $D^k_{I,J}$ need be retained at any given time.

As mentioned above, the efficiency of query execution can be increased through the use of the concept of transitive closure (TC). Consider the following example:

SELECT    L_SHIPMODE,SUM(CASE    WHEN O_ORDERPRIORITY='1URGENT'    OR O_ORDERPRIORITY= '2-HIGH' THEN 1 ELSE 0 END)
FROM    LINEITEM    WHERE L_COMMITDATE<L_RECEIPTDATE    AND L_SHIPDATE<L_COMMITDATE    AND L_RECEIPTDATE>='1994-01-01'    AND L_RECEIPTDATE<('1994-06-06')    GROUP    BY L_SHIPMODE;

From this example, it can be the sequence of conditions related by <= relations from least to greatest is S1= (L_SHIPDATE<=L_COMMITDATE−1 and L_COMMITDATE<= L_RECEIPTDATE−1 and L_RECEIPTDATE<='1994-06-05'). The new constraints that can be derived from S1 or TC(S1) are (L_COMMITDATE<='1994-06-04' and L_SHIPDATE<='1994-06-03'). If LINEITEM or one of its join/cover indexes is value ordered/partitioned (such as by using value ordered indices) on L_SHIPDATE then the new constraint L_SHIPDATE<='1994-06-03' will allow the DBS to access only a portion of the table instead of doing a full table scan. The new constraints are also useful where there is no value ordering. That is, the new constraints may reduce the size of an intermediate result even when they do not provide an access path as in the value ordering case.

A system for determining the satisfiability and transitive closure of conditions in a query, such as those in the preceding paragraph, uses a modified version of the SPA-SAT algorithm described above. That algorithm works only for integer domains because, in theory, inequalities such as "<" or ">" cannot be converted to <= for real domains. The algorithm is modified by making the comparison to the real number that is the next smaller or larger to the number being compared. For example, if X is of type REAL, then X>5 would be converted to X>=C, where C is the smallest real value greater than 5. Note that the difference between two consecutive real values is not fixed. The algorithm to find the next higher or lower real number is known and is hardware and operating system specific.

Further, it is not possible to convert a comparison like X<Y+C (similarly X>Y+C) to a less-than-or-equal-to (<=) comparison. The next real/float value cannot be applied in such situations because such a comparison depends on the specific value of X and Y. Such conditions can be handled by converting them to <= and <>. For example, X>Y+3 will be converted to Y<=X−3 and Y<>X−3. This transformation and existing conditions that involve <> require modifying SPA-SAT to process <> conditions.

Figure 9:
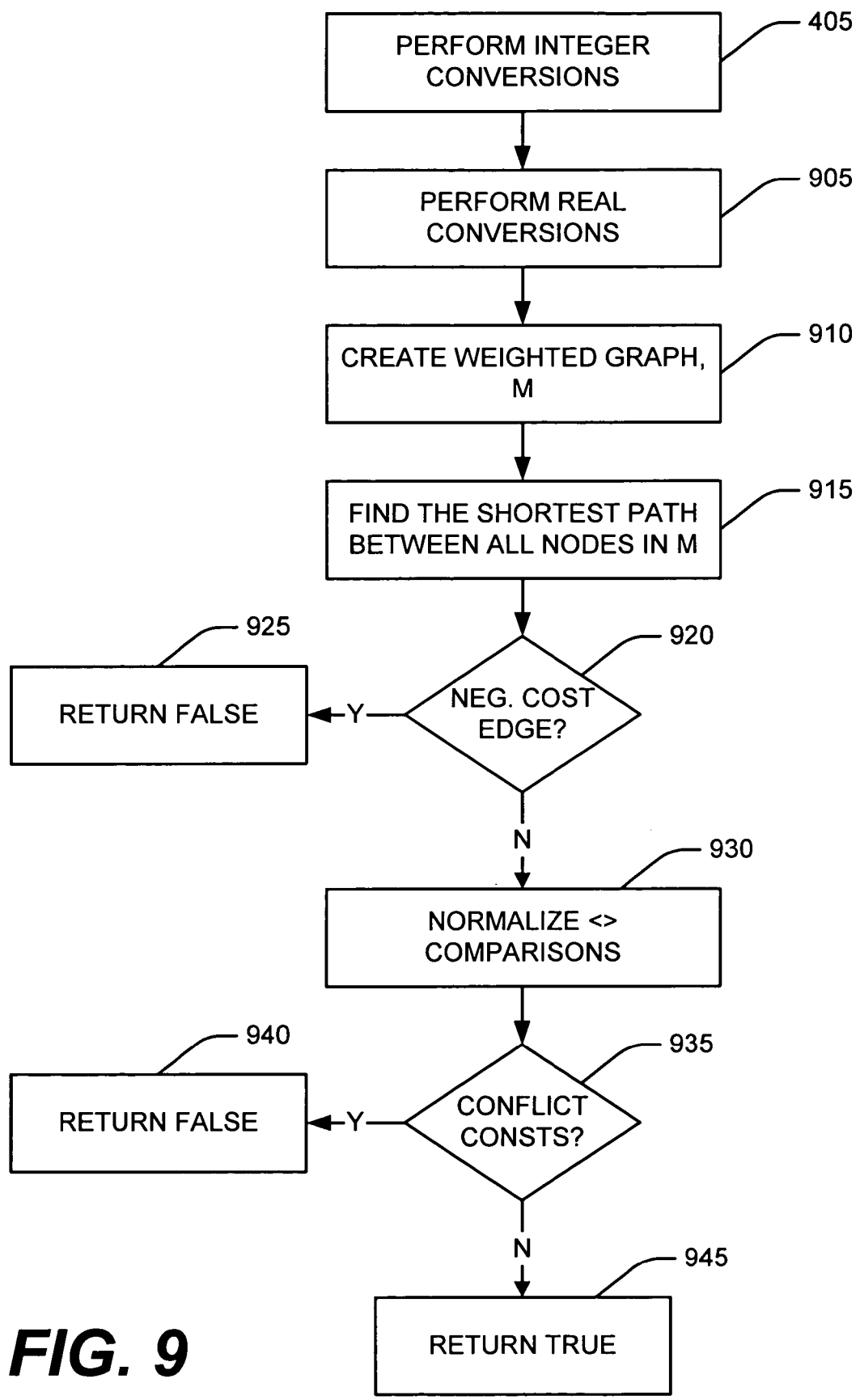

Overall, the modified SPA-SAT or SPA-SAT-New handles comparisons of non-integer variables to constants, comparisons of non-integer variables and <> comparisons. The following is a formal definition of SPA-SAT-New (see FIG. 9):

Function SPA-SAT-New
{This algorithm handles comparisons of non-integer variables to constants, comparisons of non-integer variables and <> comparisons.}

Begin

1. Convert conditions applicable to SPA-SAT as before (block 405, see also FIG. 5).

Figure 10:
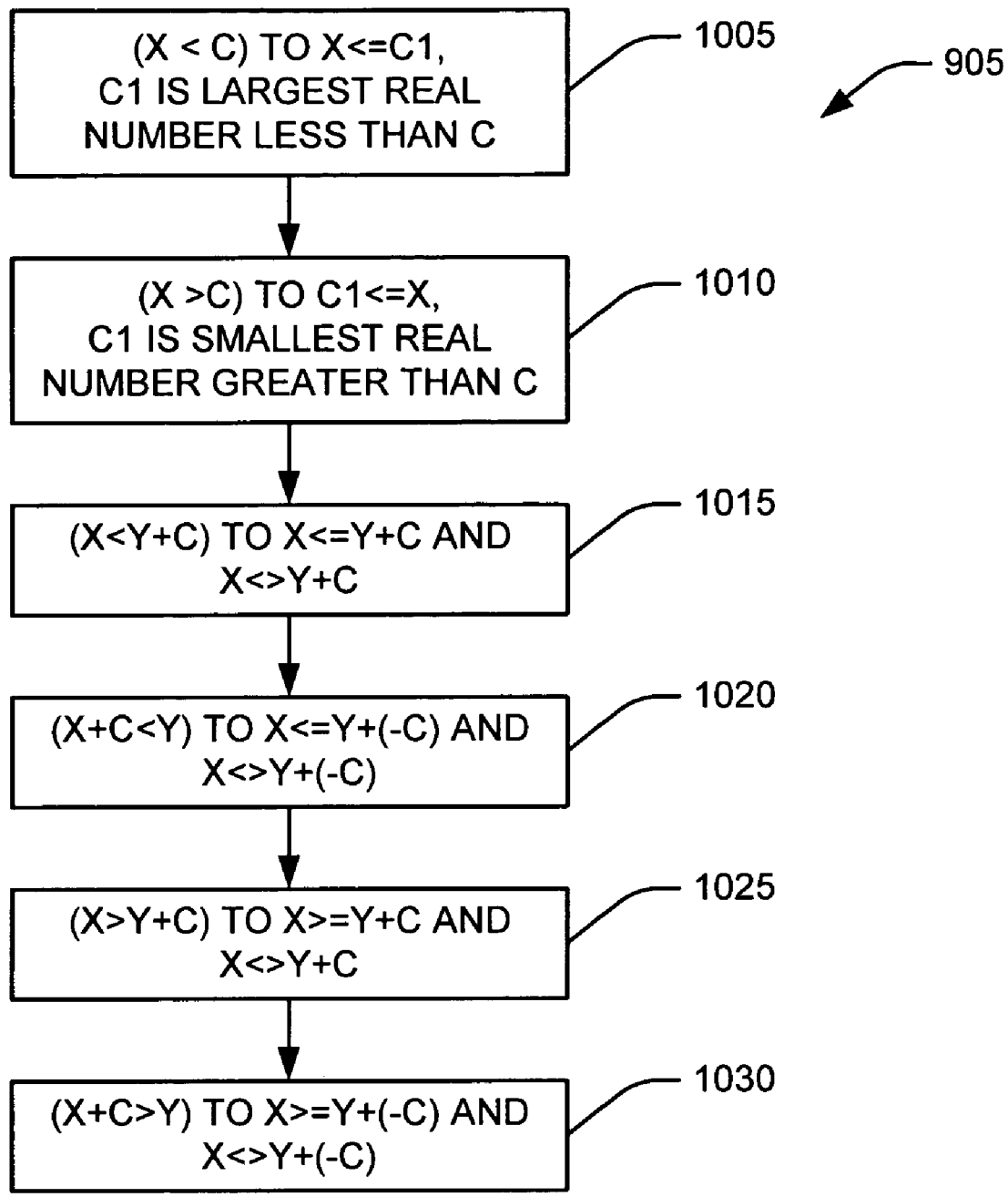

Perform real conversions (block 905, see also FIG. 10):

2. Convert X<C (if X is of real domain) to X<=C1, where C1 is the largest real number less than C (block 1005).

3. Convert X>C (if X is of real domain) to C1<=X, where C1 is the smallest real number greater than C (block 1010).

4. Convert X<Y+C to X<=Y+C and X<>Y+C (block 1015).

5. Conversions of X+C<Y, X>Y+C and X+C>Y are similar to 4 (block 1020, 1025, 1030).

6. Create a weighted graph M (block 910). Find the shortest path between all nodes in M using "Floyd-Warshall Shortest Path Algorithm" (block 915). The resulting updated M also will have the shortest paths between the nodes.

7. The set of constraints is contradictory if M has a negative cost edge from a node to itself (block 920). If the set of constraints is contradictory, terminate the procedure and returns FALSE (block 920).

8. Normalize all <> comparisons to either X<>Y+C or X<>C (block 930). For example, X−3<>Y+2 will be normalized to X<>Y+5 and X+2<>4 will be normalized to X<>2.

Figure 11:
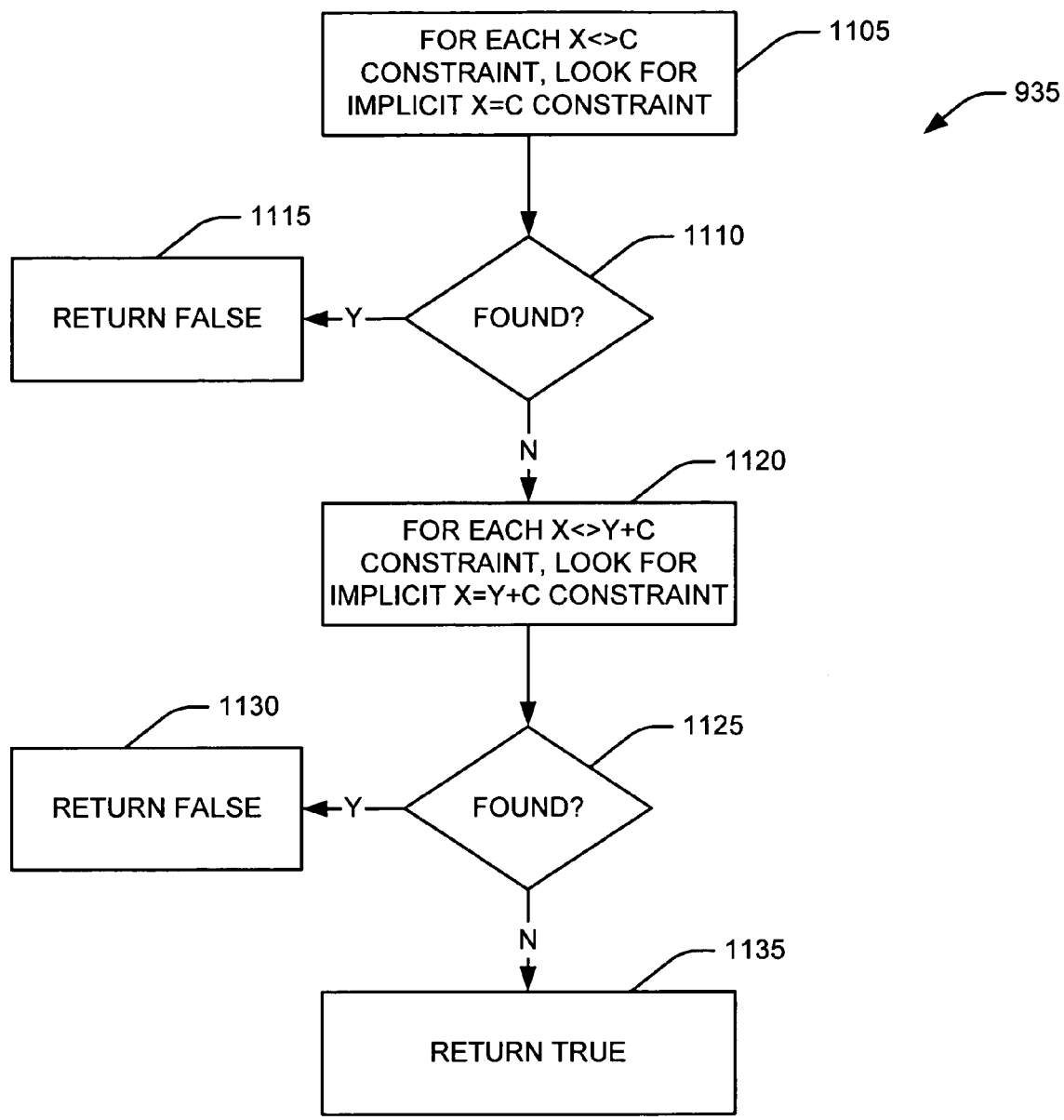
Figure 12:
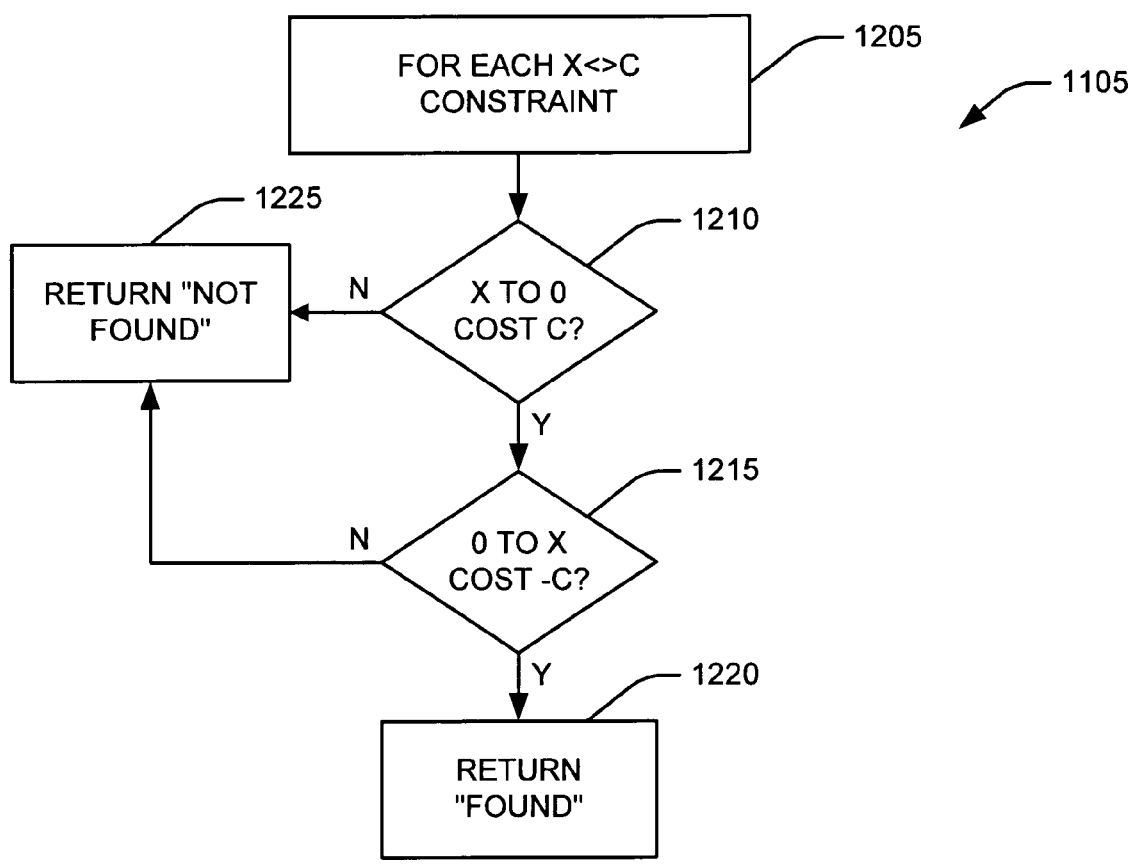

9. Check for conflicts in the constraints (block 935) and return FALSE if conflicts exist (block 940). In particular, as shown in FIG. 11, for each constraint of the form X<>C, if X=C could be implicitly found in M (block 1105) then a contradiction is found (block 1110) and FALSE is returned (block 1115). As shown in FIG. 12, the search for implicit X=C constraints is accomplished for every X<>C constraint (block 1205), by deducing from M if there is an edge from X to 0 (the special node introduced in SPA-SAT) with cost C (X<=C) (block 1210) and an edge from 0 to X with cost −C (0<=X−C which the same as X>=C) (block 1215). If both conditions are true, an X=C condition is found (block 1220), otherwise such a condition is not found (block 1225).

Figure 13:
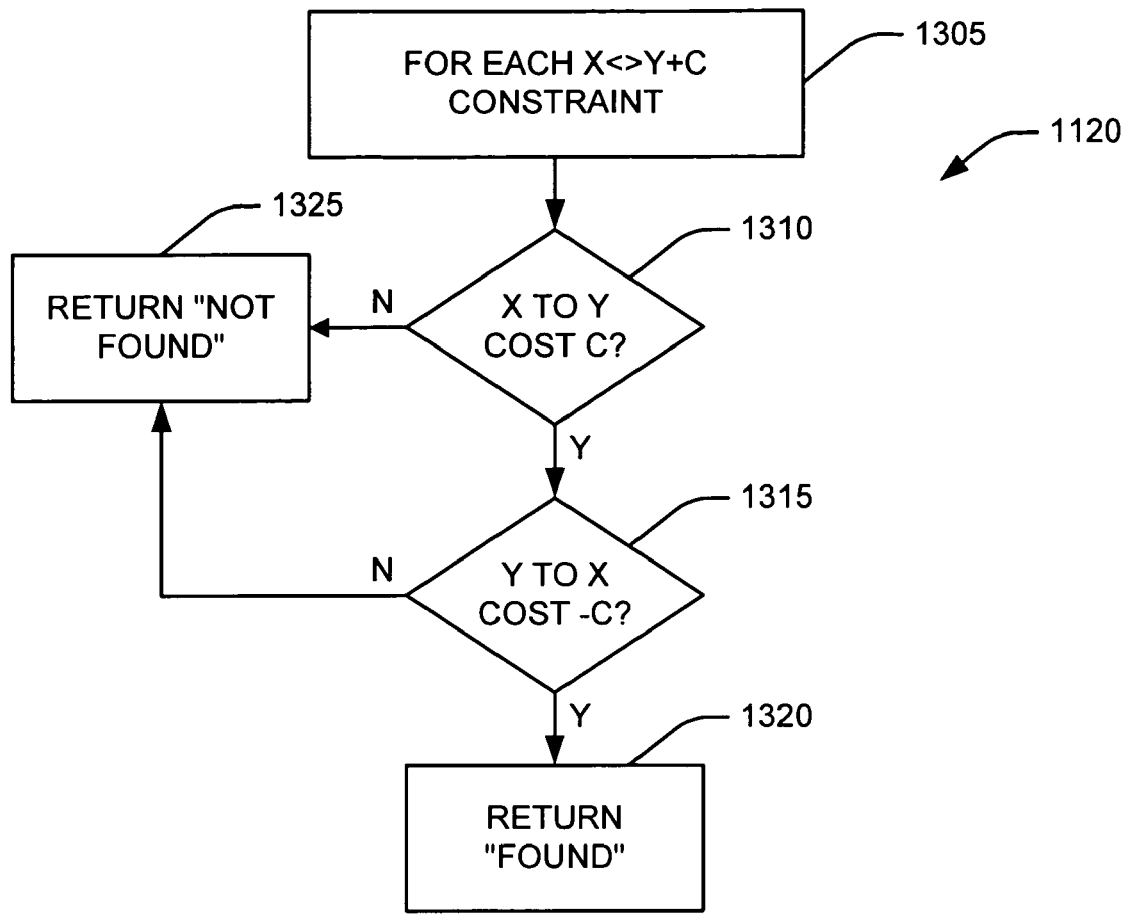

10. Further, for each constraint of the form X<>Y+C, if X=Y+C could be implicitly found in M (block 1120) then a contradiction is found (block 1125) and FALSE is returned (block 1130). As shown in FIG. 13, the search for implicit X=Y+C constraints is accomplished for every X<>Y+C constraint (block 1305), by deducing from M if an edge from X to Y with cost C (X<=Y+C) (block 1310) and there is an edge from Y to X with cost −C (Y<=X−C which the same as X>=Y+C) (block 1315). If both conditions are true, an X=Y+C condition is found (block 1320), otherwise such a condition is not found (block 1325). This test also covers the special case of X<>Y where C=0.

11. Return TRUE if there are no conflicts (block 945).

end

Figure 14:
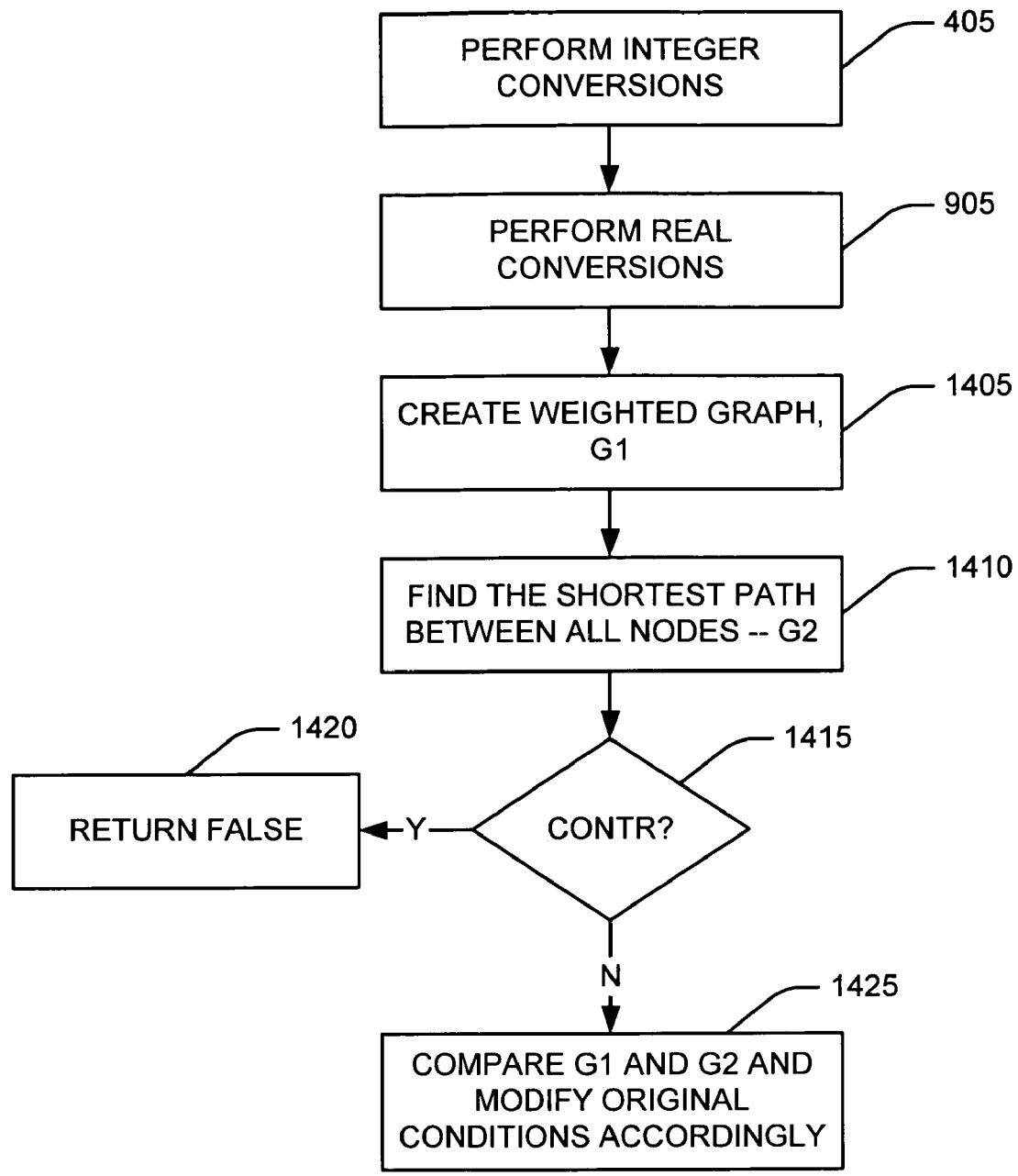
Figure 15:
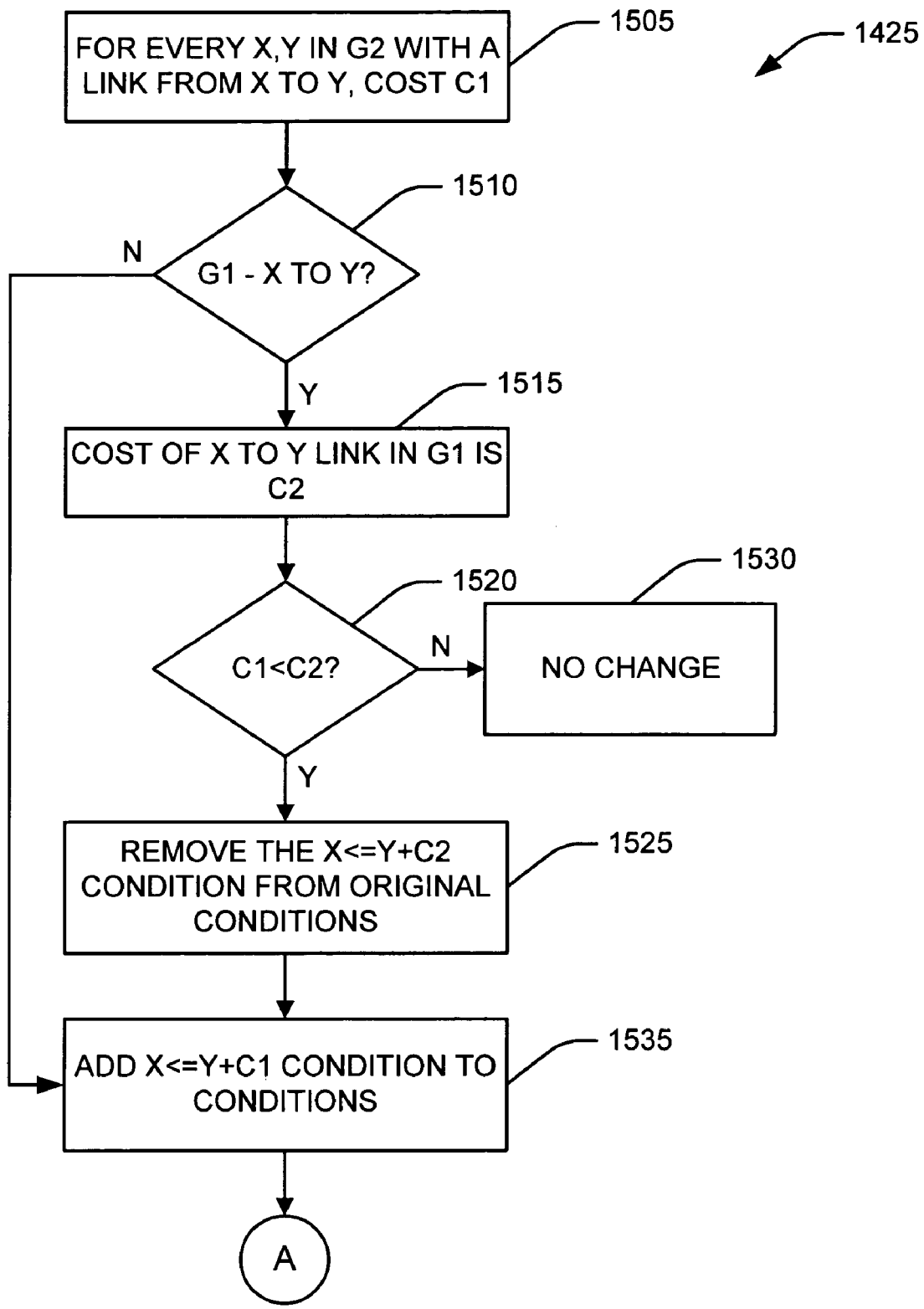

The following, illustrated in FIG. 14, is an outline of how TC is computed from SPA-SAT-New:

Perform the integer conversions (block 405) and the real conversions (block 905).

Create a weighted graph and save it as G1 (block 1405).

Run SPA-SAT-New and call the final graph G2 (block 1410).

If a contradiction was found by SPA-SAT-New (block 1415), return and terminate this procedure (block 1420).

Otherwise (block 1425, illustrated in detail in FIG. 14), for every pair of variables X and Y in G2 for which there is a link from X to Y with cost C1 (block 1505).

1. If C1 is less than the shortest path from X to Y in G1 (say C2) (blocks 1510, 1515, 1520), then remove the condition X<=Y+C2 (or the condition that was normalized to X<= Y+C2) from the original conditions (block 1525) and add X<=Y+C1 (block 1530). Otherwise, there is no change (block 1530).

2. If G1 does not have a link from X to Y, then simply add X<=Y+C1 to the original query condition (block 1535).

Figure 16:
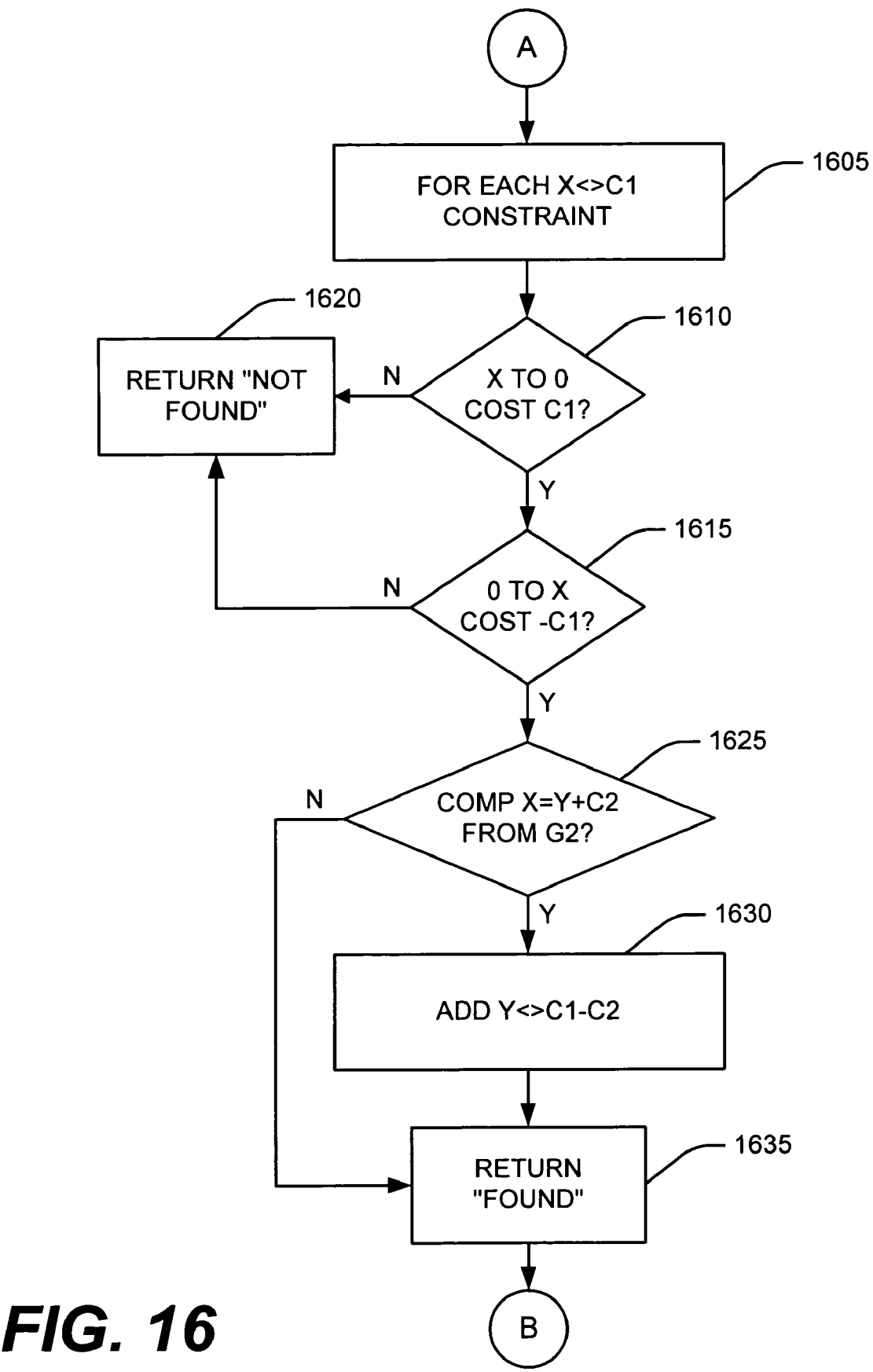

As shown in FIG. 16, for all X<>C1 constraints found by SPA-SAT-New (blocks 1605, 1610, 1615, 1620) and X=Y+C2 could be computed from G2 (block 1525), add Y<>C1−C2 (block 1630) and otherwise do not make such an addition (block 1635).

Figure 17:
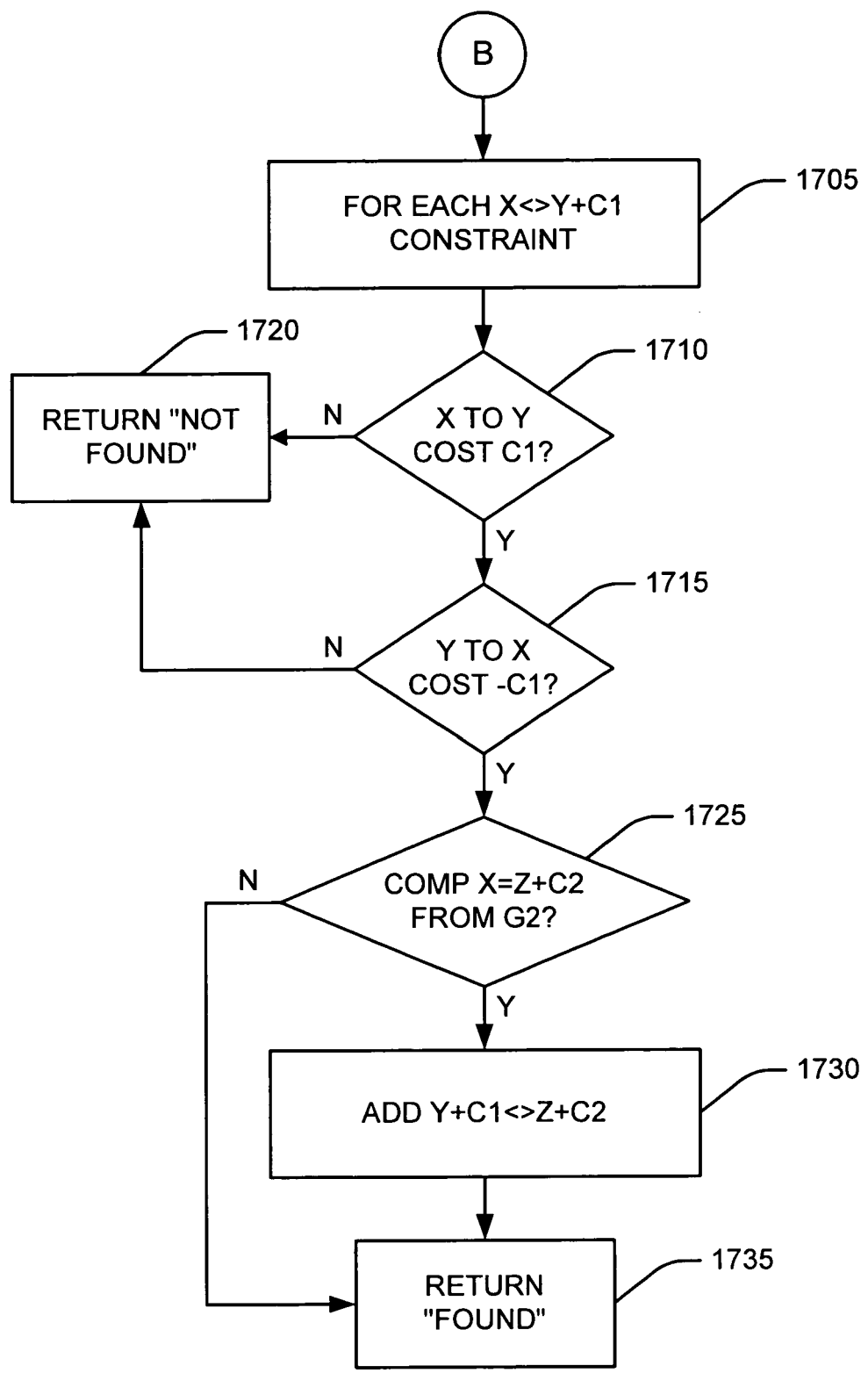

As shown in FIG. 17, for all X<>Y+C1 found by SPA-SAT-New (blocks 1705, 1710, 1715, 1720) and X=Z+C2 could be computed from G2 (block 1725), then add Y+C1<>Z+C2 (block 1730) and otherwise do not make such an addition (block 1735).

An example of the application of this algorithm uses the following constraints:

V1<=V2 V1<5 V2<4

The algorithm converts these constraints to:

V1<=V2+(−1) V1<=0+4 V2<=0+4

Figure 18:
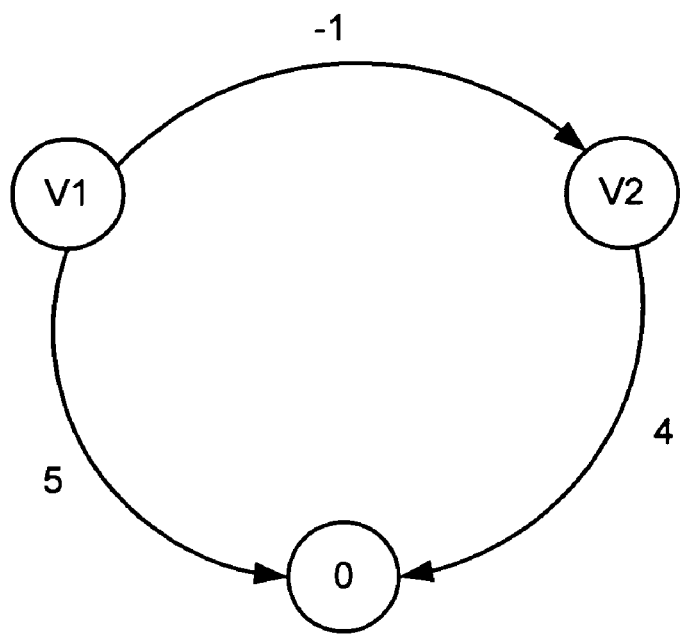
FIG. 18 illustrates a weighted map before and after applying a shortest path algorithm.

A graph, illustrated in FIG. 18, is then constructed. The graph has three nodes, one for V1, one for V2, and one for "0." Edges are created in the graph according to the rules in the algorithm. The original graph G1 is saved. The SPA-SAT-NEW algorithm is then executed to produce a new graph G2. Upon examining G1 and G2, it can be seen that the V1 to "0" entry is smaller in G2, where it is "3," than in G1, where it is "5." The query will then be modified by eliminating the V1<5 constraint and replacing it with a V1<3 constraint. It will be understood that applying this algorithm to queries containing such constraints, and much more complex constraints, will be simplified.

Another algorithm for determining the satisfiability and transitive closure of a set of constraints, which will be referred to for simplicity as the IN algorithm, does not use the SPA-SAT-NEW algorithm described above. The conditions are conjunctions of comparisons, where each comparison could be one of the following forms:

X=Y

X◇Y

X IN (value1,value2, . . . ), where all value1, value2, . . . valuen are constants.

X NOT IN (value1,value2, . . . ), where all value1, value2, . . . valuen are constants.

X op Constant, where op $\epsilon\{<,=,>,>=,<=,\diamond\}$

X and Y could be of any data type for the above forms except that comparisons in $\epsilon\{<,>,>=,<=\}$ should have only numeric variables and constants. The following are the differences between this algorithm and the algorithm that uses SPA-SAT-NEW:

1. The SPA-SAT-NEW algorithm does not accommodate the IN and NOT IN clause while the IN algorithm does;
2. The IN algorithm does not require conditions to be normalized to <= conditions;
3. The IN algorithm allows more data types than the SPA-SAT-NEW algorithm;
4. The IN algorithm allows only = and ◇ for comparisons between variables while the SPA-SAT-NEW algorithm allows more general comparisons between variables.

A main differentiator in the IN algorithm is the handling of the IN clause which is very common in query conditions that require testing for SAT and computing TC.

Figure 19:
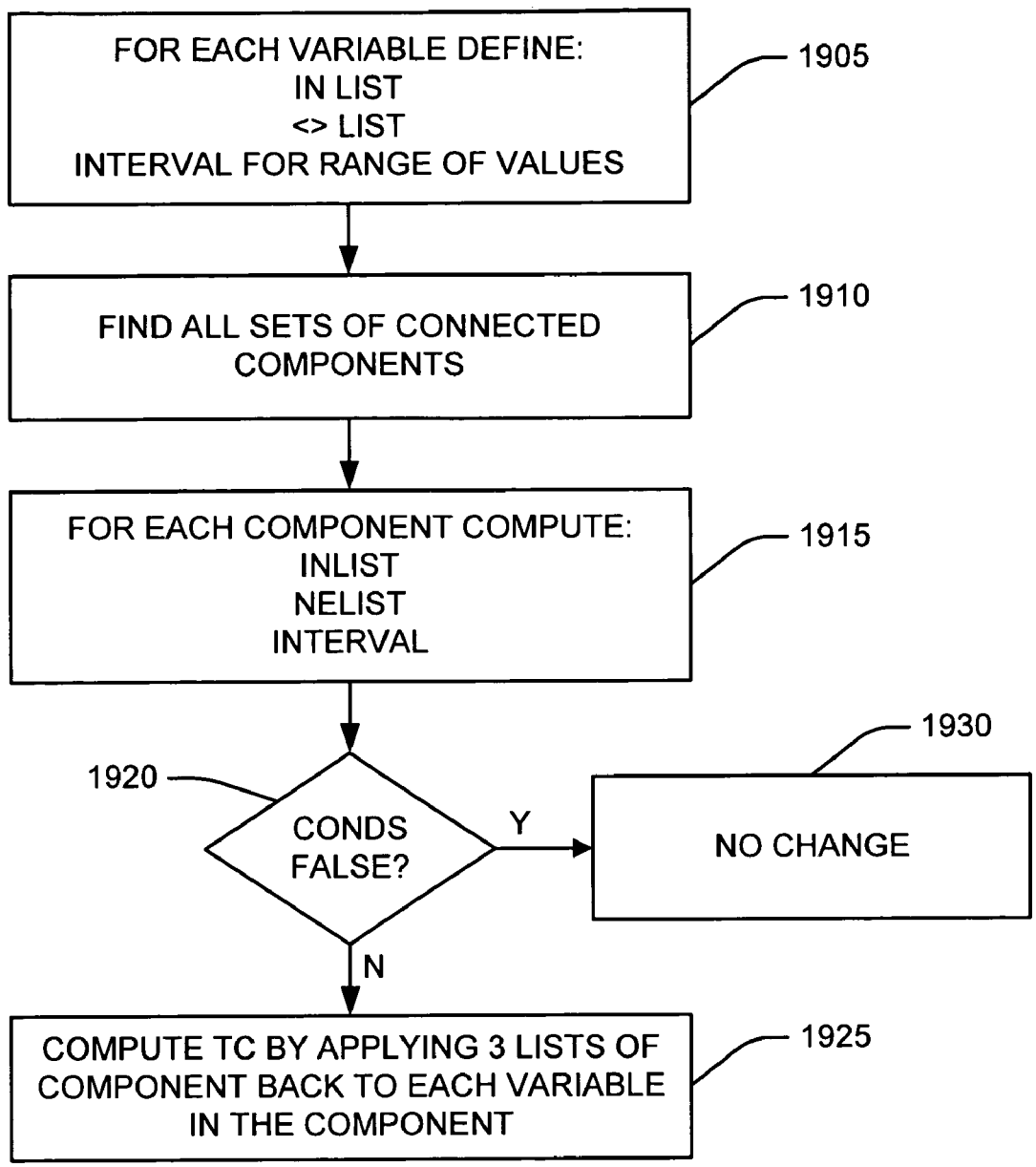
Figure 20:
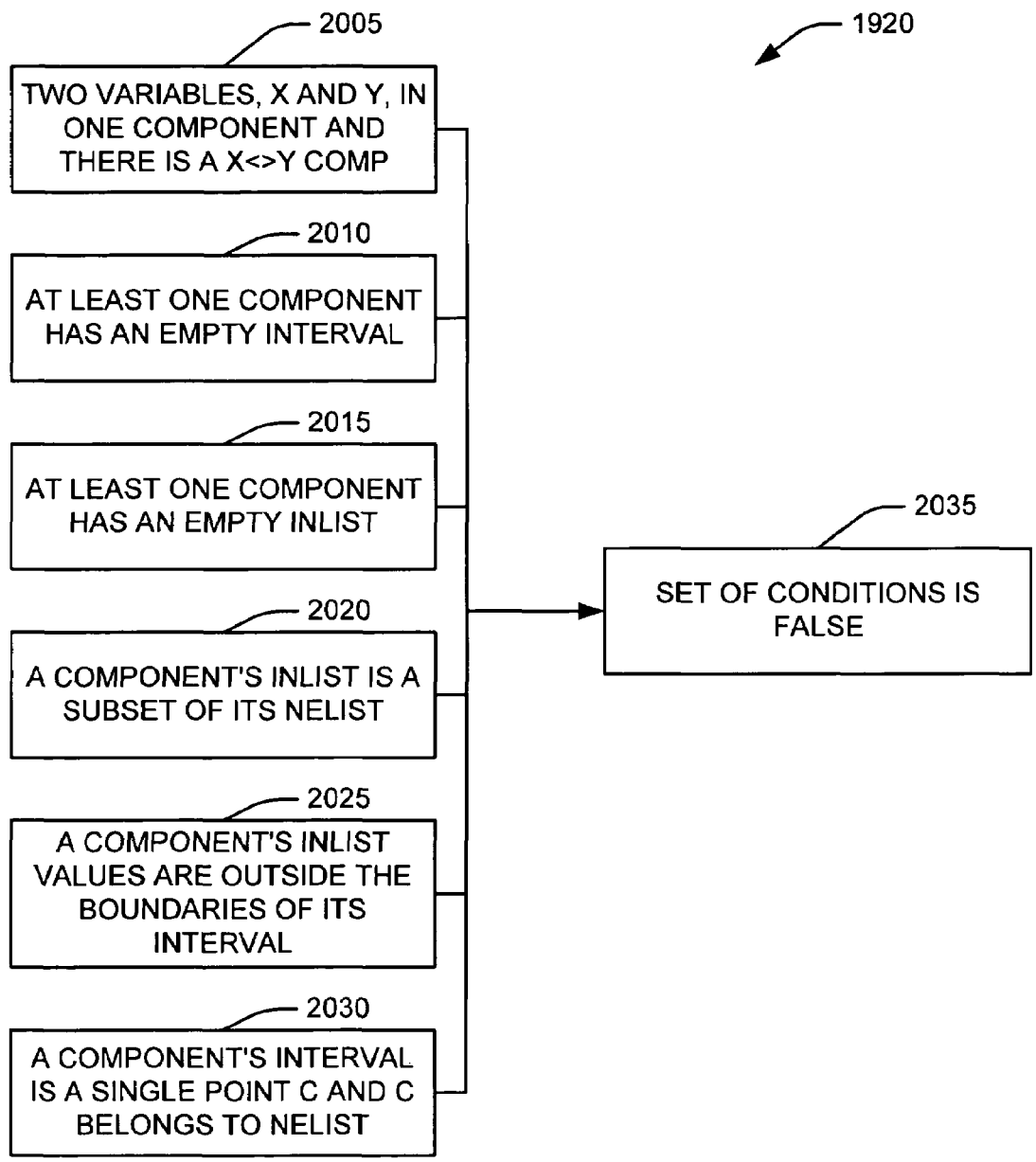

The IN algorithm is described below and illustrated in FIGS. 19 and 20:

Procedure TC_and_SAT2

Begin

1. For each variable define an in list, a ◇list, and an interval for the range of values (block 1905). The ◇list also includes the NOT IN list.
2. Find all sets of connected components based on X=Y (block 1910). For example {X1=X2 and X2=X4 and X3=X5} will have two connected components where the first one is {X1,X2,X4} and the second is {X3,X5}.
3. For each component in 2, compute the INLIST which contains the in list values for this component (block 1915). That list will be the intersection of the in lists for the variables in that component.
4. For each component in 2, compute the NELIST which contains the in list values for this component (block 1915). That list will be the union of the ◇values for the variables in that component.
5. For each component in 2, compute the INTERVAL which contains the interval of values for this component (block 1915). That list will be the intersection of the intervals for the variables in that component.
6. The set of conditions are false (block 1920) if one of the following conditions is satisfied (block 1920, illustrated in more detail in FIG. 20):
   a) Two variables X and Y are in one component and there is comparison of the form X◇Y (block 2005);
   b) At least one component has an empty INTERVAL (like X>2 and X<1) (block 2010);
   c) At least one component has an empty INLIST (block 2015);
   d) The combination of any pair of INLIST, NELIST and INTERVAL of a component is contradictory.
      an INLIST and an NELIST are contradictory if INLIST is a subset of NELIST (block 2020);
      an INLIST and an INTERVAL are contradictory if all the INLIST values are outside the boundaries of INTERVAL (block 2025);
      an NELIST and an INTERVAL are contradictory if INTERVAL is a single point C interval and C belongs to NELIST (block 2030).
7. If the conditions are not contradictory (block 1920, FIG. 19) then TC is computed by applying the three lists of a component back to each variable in the component (block 1920). Otherwise (block 2035, FIG. 20), the variables are not changed (block 1930, FIG. 19).

End

The complexity of the SAT part of the above algorithm is $O(n^3+m)$ if n is the number of variables and m is the number of conditions in the query which is determined by analyzing the complexities of each step as the following:

1. It takes $O(n)$ to perform element 1.
2. It takes $O(n^2)$ to perform element 2.
3. Each of elements 3,4 and 5 takes $O(n)$ steps since the maximum number of components is n.
4. Element 6a in the worst case takes $O(n^3)$ since there are at most n components and the maximum number of pair wise X◇Y is $O(n^2)$.
5. Each of 6b, 6c, and 6d runs in $O(n)$ steps.

The number of conditions found from step 7 is at most $O(n*m)$.

The following are examples of conditions where the conditions fail because of contradictions in a pair of INLIST, NELIST and INTERVAL of a component:

1. X=Y AND X IN (1,3,4) AND Y>=5 AND Y<=10. X and Y are one component which has (1,3,4) as an INLIST and (5,10) as an INTERVAL. The INLIST and INTERVAL are contradictory because all the values in the INLIST are outside the INTERVAL.
2. The INLIST is (1,3,4), the INTERVAL is (3,3) and the NELIST is (3). The NELIST and the INTERVAL contradict because the INTERVAL is a single point (3) and the single point belongs to the NELIST.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for improving the efficiency of execution of a database query including conditions, the method including:

analyzing the satisfiability of the conditions before executing the query;

if the conditions are satisfiable, analyzing the transitive closure of the conditions; and modifying the conditions to meet transitive closure, if necessary, before executing the query;

where analyzing satisfiability includes:
    converting the conditions to less-than-or-equal-to conditions;
    creating a map M of the less-than-or-equal-to conditions;
    finding the shortest path between all nodes in M; and
    determining if M has a negative cycle and, if it does, returning that the conditions are not satisfiable.

2. The method of claim 1 in which the conditions include integer variables X and Y and constants, C, where converting the conditions includes:
    converting conditions of the form (X<Y+C) to conditions of the form (X<=Y+(C−1));
    converting conditions of the form (X>Y+C) to conditions of the form (Y<=X+(−C−1));
    converting conditions of the form (X=Y+C) to conditions of the form (X<=Y+C) and (Y<=X+(−C));
    performing no conversion for (X<=Y+C);
    converting conditions of the form (X<=C) to conditions of the form (X<=0+C);
    converting conditions of the form (X<C) to conditions of the form (X<=0+(C−1));
    convert conditions of the form (X>=C) to conditions of the form (0<=X+(−C));
    convert conditions of the form (X>C) to conditions of the form (0<=X+(−C−1)); and
    convert conditions of the form (X=C) to conditions of the form (X<=0+C) and (0<=X+(−C)).

3. The method of claim 1 in which the conditions include real variables U and V and constants, C, where converting the conditions includes:
    converting conditions of the form U<C to conditions of the form U<=C1, where C1 is the largest real number less than C;
    converting conditions of the form U>C to conditions of the form C1<=U, where C1 is the smallest real number greater than C;
    converting conditions of the form U<V+C to conditions of the form U<=V+C and U◇V+C;
    converting conditions of the form U+C<V to conditions of the form U<=V−C and U◇V−C;
    converting conditions of the form U>V+C to conditions of the form U>=V+C and U◇V+C; and
    converting conditions of the form U+C>V+C to conditions of the form U>=V−C and U◇V−C.

4. The method of claim 1 where creating a map M of the less-than-or-equal-to conditions includes:
    creating a node for each of the variables in the conditions;
    creating a node for 0;
    creating a directed edge from a node representing a first variable, S, to a node representing a second variable, T, with a cost, C, for conditions of the form (S<=T+C);
    creating a directed edge from a node representing a first variable, S, to the 0 node, with cost, C, for conditions of the form (S<=0+C); and
    creating a directed edge from the 0 node to a node representing a first variable, S, with cost, C, for conditions of the form (0<=X+C).

5. The method of claim 1 where finding the shortest path between all nodes in M includes running the Floyd-Warshall Shortest Path Algorithm against M.

6. The method of claim 1 where determining if M has a negative cycle includes finding if M includes a negative cost edge from a node to itself.

7. The method of claim 1 where analyzing the transitive closure of the conditions and modifying the conditions to achieve transitive closure includes
    saving the map M as G1, G1 mapping the cost of edges between a plurality of variables in M, before finding the shortest path between all nodes in M;
    saving the map M as G2, G2 mapping the shortest path between each of the plurality of variables in M, after finding the shortest path between all nodes in M;
    for each pair of variables X and Y in G2 for which there is a path from X to Y with cost C1,
        if C1 is less than the shortest path from X to Y in G1, C2,
            removing the condition from the query that created the path from X to Y in G1;
            adding a condition X<=Y+C1 to the query; and
        if G1 does not have a link from X to Y
            adding a condition X<=Y+C1 to the query.

8. A computer-implemented method for improving the efficiency of execution of a database query including conditions, the method including:
    analyzing the satisfiability of the conditions before executing the query;
    if the conditions are satisfiable, analyzing the transitive closure of the conditions; and
    modifying the conditions to meet transitive closure, if necessary, before executing the query;
    where the conditions include one or more variables, the conditions may include one or more SQL IN (inlist) conditions, the conditions may include one or more SQL NOT IN (not in list) conditions, and analyzing the satisfiability of the conditions includes
        for each variable in the query, defining an in list from a SQL IN statement associated with the variable, a ◇list from the SQL NOT IN statement's not in list and any other query statements that relate the variable to a constant with a ◇operator, and an interval for the range of values associated with the variable;
        finding all components, where each component includes variables related in the query by an equals relation;
        for each component:
            computing an INLIST for the component which contains the intersection of the in lists for the variables in the component;
            computing an NELIST for the component which contains the union of the ◇lists for the variables in the component;
            computing an INTERVAL for the component which contains the intersection of the intervals for the variables in the component;
        determining that the conditions are not satisfiable if any of the following conditions are met:
            two variables X and Y are in one component and one of the conditions is of the form X◇Y;
            at least one component has an empty INTERVAL;
            at least one component has an empty INLIST; or
            the combination of any pair of INLIST, NELIST and INTERVAL of a component is contradictory, where:

an INLIST and an NELIST are contradictory if the INLIST is a subset of the NELIST;
an INLIST and an INTERVAL are contradictory if all the INLIST values are outside the values of the INTERVAL;
an NELIST and an INTERVAL are contradictory if the INTERVAL is a single point.

9. The method of claim 8 wherein modifying the conditions to meet transitive closure includes
applying the INLIST, NELIST, and INTERVAL for a component to each variable in the component.

10. A computer-implemented method for determining the satisfiability of and creating transitive closure in conditions in a database query, the conditions including a plurality of variables and constants, the method including:
converting the conditions to less-than-or-equal-to conditions between variables and constants;
creating a map M of the costs of the less-than-or-equal-to conditions between the plurality of variables and constants in the conditions;
saving the map M as G1;
finding the shortest path between all nodes in M, and referring to the map with the shortest paths as G2, G2 mapping the shortest path between each of the plurality of variables in M;
determining if M has a negative cycle and, if it does, returning that the conditions are not satisfiable;
for each pair of variables X and Y in G2 for which there is a path from X to Y with cost C1,
if C1 is less than the shortest path from X to Y in G1, C2,
removing the condition from the query that created the path from X to Y in G1;
adding a condition X<=Y+C1 to the query; and
if G1 does not have a link from X to Y
adding a condition X<=Y+C1 to the query.

11. A computer-implemented method for determining the satisfiability of and creating transitive closure in conditions in a database query, the conditions including one or more variables, the conditions including zero or more SQL IN (inlist) conditions, the conditions including zero or more SQL NOT IN (not in list) conditions, the method including:
for each variable in the query, defining an in list from a SQL IN statement associated with the variable, a <>list from the SQL NOT IN statements not in list and any other query statements that relate the variable to a constant with a <>operator, and an interval for the range of values associated with the variable;
finding all components, where each component includes variables related in the query by an equals relation;
for each component:
computing an INLIST for the component which contains the intersection of the in lists for the variables in the component;
computing an NELIST for the component which contains the union of the <>lists for the variables in the component;
computing an INTERVAL for the component which contains the intersection of the intervals for the variables in the component;
determining that the conditions are not satisfiable if any of the following conditions are met:
two variables X and Y are in one component and one of the conditions is of the form X<>Y;
at least one component has an empty INTERVAL;
at least one component has an empty INLIST; or
the combination of any pair of INLIST, NELIST and INTERVAL of a component is contradictory, where:
an INLIST and an NELIST are contradictory if the INLIST is a subset of the NELIST;
an INLIST and an INTERVAL are contradictory if all the INLIST values are outside the values of the INTERVAL;
an NELIST and an INTERVAL are contradictory if the INTERVAL is a single point; and
if the conditions are satisfiable, applying the INLIST, NELIST, and INTERVAL for a component to each variable in the component.

12. A computer-implemented method for analyzing satisfiability of conditions associated with a query, in which the conditions include integer variables X and Y, real variables U and V, and constants, C, the method including:
converting conditions of the form (X<Y+C) to conditions of the form (X<=Y+(C−1));
converting conditions of the form (X>Y+C) to conditions of the form (Y<=X+(−C−1));
converting conditions of the form (X=Y+C) to conditions of the form (X<=Y+C) and (Y<=X+(−C));
performing no conversion for (X<=Y+C);
converting conditions of the form (X<=C) to conditions of the form (X<=0+C);
converting conditions of the form (X<C) to conditions of the form (X<=0+(C−1));
convert conditions of the form (X>=C) to conditions of the form (0<=X+(−C));
convert conditions of the form (X>C) to conditions of the form (0<=X+(−C−1));
convert conditions of the form (X=C) to conditions of the form (X<=0+C) and (0<=X+(−C))
converting conditions of the form U<C to conditions of the form U<=C1, where C1 is the largest real number less than C;
convert conditions of the form U>C to conditions of the form C1<=U, where C1 is the smallest real number greater than C;
convert conditions of the form U<V+C to conditions of the form U<=V+C and U<> V+C;
convert conditions of the form U+C<V to conditions of the form U<=V−C and U<> V−C;
convert conditions of the form U>V+C to conditions of the form U>=V+C and U<> V+C;
convert conditions of the form U+C>V+C to conditions of the form U>=V−C and U<> V−C;
creating a map M of the less-than-or-equal-to conditions;
finding the shortest path between all nodes in M; and
determining if M has a negative cycle and, if it does, returning that the conditions are not satisfiable.

13. The method of claim 12 where creating a map M of the less-than-or-equal-to conditions includes:
creating a node for each of the variables in the conditions;
creating a node for 0;
creating a directed edge from a node representing a first variable, S, to a node representing a second variable, T, with a cost, C, for conditions of the form (S<=T+C);
creating a directed edge from a node representing a first variable, S, to the 0 node, with cost, C, for conditions of the form (S<=0+C); and
creating a directed edge from the 0 node to a node representing a first variable, S, with cost, C, for conditions of the form (0<=X+C).

14. The method of claim 12 where finding the shortest path between all nodes in M includes running the Floyd-Warshall Shortest Path Algorithm against M.

15. The method of claim 12 where determining if M has a negative cycle includes finding if M includes a negative cost edge from a node to itself.

16. A computer program, stored on a tangible storage medium, for use in improving the efficiency of execution of a database query including conditions, the program including executable instructions that cause a computer to:
analyze the satisfiability of the conditions before executing the query;
if the conditions are satisfiable, analyze the transitive closure of the conditions; and
modify the conditions to meet transitive closure, if necessary, before executing the query;
where, in analyzing the satisfiability of the conditions, the computer:
converts the conditions to less-than-or-equal-to conditions;
creates a map M of the less-than-or-equal-to conditions;
finds the shortest path between all nodes in M; and
determines if M has a negative cycle and, if it does, returning that the conditions are not satisfiable.

17. A computer program, stored on a tangible storage medium, for use in improving the efficiency of execution of a database query including conditions, the program including executable instructions that cause a computer to:
analyze the satisfiability of the conditions before executing the query;
if the conditions are satisfiable, analyze the transitive closure of the conditions; and
modify the conditions to meet transitive closure, if necessary, before executing the query;
where the conditions include one or more variables, the conditions may include one or more SQL IN (inlist) conditions, the conditions may include one or more SQL NOT IN (not in list) conditions, and, in analyzing the satisfiability of the conditions, the computer:
for each variable in the query, defines an in list from a SQL IN statement associated with the variable, a $\diamond$list from the SQL NOT IN statement's not in list and any other query statements that relate the variable to a constant with a $\diamond$operator, and an interval for the range of values associated with the variable;
finds all components, where each component includes variables related in the query by an equals relation;
for each component:
computes an INLIST for the component which contains the intersection of the in lists for the variables in the component;
computes an NELIST for the component which contains the union of the $\diamond$lists for the variables in the component;
computes an INTERVAL for the component which contains the intersection of the intervals for the variables in the component; and
determines that the conditions are not satisfiable if any of the following conditions are met:
two variables X and Y are in one component and one of the conditions is of the form X$\diamond$Y;
at least one component has an empty INTERVAL;
at least one component has an empty INLIST; or
the combination of any pair of INLIST, NELIST and INTERVAL of a component is contradictory, where:
an INLIST and an NELIST are contradictory if the INLIST is a subset of the NELIST;
an INLIST and an INTERVAL are contradictory if all the INLIST values are outside the values of the INTERVAL;
an NELIST and an INTERVAL are contradictory if the INTERVAL is a single point.

* * * * *